(12) United States Patent
Chee et al.

(10) Patent No.: US 6,774,923 B2
(45) Date of Patent: Aug. 10, 2004

(54) DUAL POLYGON LASER PRINTHEAD FOR A COLOR PRINTER

(75) Inventors: Christopher Gregory Chee, Lexington, KY (US); Daniel Eugene Pawley, Louisville, KY (US); Earl Dawson Ward, II, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 64 days.

(21) Appl. No.: 10/160,223

(22) Filed: May 31, 2002

(65) Prior Publication Data

US 2003/0222967 A1 Dec. 4, 2003

(51) Int. Cl.[7] .......................... B41J 2/47; G01D 15/14; G02B 26/00; G02B 27/00
(52) U.S. Cl. ..................................... 347/243
(58) Field of Search ................. 247/243, 242, 247/244, 245, 255, 256, 257, 258, 259, 260, 261, 263; 399/4, 5, 7, 151; 347/243, 242, 241, 240, 239, 237, 232, 231, 251, 255, 256, 257, 258, 259, 261, 263, 245

(56) References Cited

U.S. PATENT DOCUMENTS

| | | | |
|---|---|---|---|
| 5,151,714 A | 9/1992 | Okino et al. | |
| 5,164,783 A | 11/1992 | Taguchi et al. | |
| 5,181,137 A | 1/1993 | Koide | |
| 5,221,954 A | 6/1993 | Harris | |
| 5,223,906 A | 6/1993 | Harris | |
| 5,251,055 A | 10/1993 | Koide | |
| 5,291,223 A | 3/1994 | Ogane et al. | |
| 5,300,962 A | 4/1994 | Genovese | |
| 5,341,158 A | 8/1994 | Appel et al. | |
| 5,343,224 A | 8/1994 | Paoli | |
| 5,351,070 A | 9/1994 | Hinton et al. | |
| 5,367,327 A | 11/1994 | Harris | |
| 5,450,119 A | 9/1995 | Hinton et al. | |
| 5,451,778 A | 9/1995 | Hubble, III et al. | |
| 5,485,194 A | 1/1996 | Tateoka | |
| 5,563,647 A | 10/1996 | Fisli | |
| 5,691,761 A | 11/1997 | Fisli | |
| 5,751,462 A | 5/1998 | Shiraishi et al. | |
| 5,784,094 A | 7/1998 | Ota et al. | |
| 5,818,506 A | 10/1998 | Yamaguchi et al. | |
| 5,903,378 A | 5/1999 | Takano et al. | |
| 5,963,354 A | 10/1999 | Shiraishi et al. | |
| 6,005,703 A | 12/1999 | Maddox et al. | |
| 6,049,350 A | 4/2000 | Yamaguchi et al. | |
| 6,052,211 A | 4/2000 | Nakajima | |
| 6,055,084 A | 4/2000 | Shiraishi et al. | |
| 6,061,162 A | 5/2000 | Shiraishi et al. | |
| 6,078,341 A | 6/2000 | Rees et al. | |
| 6,084,699 A | 7/2000 | Shiraishi et al. | |
| 6,100,912 A | 8/2000 | Shiraishi et al. | |
| 6,104,519 A | 8/2000 | Shiraishi et al. | |
| 6,163,327 A | 12/2000 | Mori et al. | |
| 6,490,072 B2 | 12/2002 | Chee | |
| 6,493,010 B1 * | 12/2002 | Takahashi et al. | |

* cited by examiner

*Primary Examiner*—Raquel Yvette Gordon
(74) *Attorney, Agent, or Firm*—Taylor & Aust, P.C.; John A. Brady

(57) ABSTRACT

An optical system particularly useful for color laser printers. Four imaging systems are provided, one for each color, black, magenta, cyan and yellow. Each imaging system has separate pre-scan and post-scan optical assemblies. Two scanning polygons are provided, and each scanning polygon is shared by two imaging systems. Both pre-scan optical assemblies shared by each scanning polygon are provided on the same side of the scanning assembly at substantially similar mirror image angles, to reduce scan image registration errors. The pre-scan and post-scan optical assemblies have improved adjustability.

27 Claims, 2 Drawing Sheets

DUAL POLYGON LASER PRINTHEAD FOR A COLOR PRINTER

BACKGROUND OF THE INVENTION

1. Field of the Invention

The present invention relates to laser scanning devices, and, more particularly, to the optical systems in color laser printers.

2. Description of the Related Art

Optical systems used in laser printers may be characterized as having three sub-systems, namely, a pre-scan optical sub-system, a scanning sub-system, and a post-scan sub-system, each with appropriate mounting hardware for properly positioning the components thereof. Typically, the pre-scan optical sub-system includes a laser diode with large beam divergence serving as a light source, a collimator lens, and a pre-scan lens. The collimator lens produces a collimated beam from the light emitted by the laser diode. The pre-scan lens focuses the processed beam to a waist.

The scanning sub-system is essentially a motor driven, rotatable, polygonal reflector, having adjacent peripheral mirror surfaces, or facets, that rotate during operation of the printer. The mirror surfaces reflect the collimated and focused beam from the pre-scan optical sub-system. The rotation direction of the reflector determines the scan direction of the beam passing to a scanned object, such as a photosensitive drum in a laser printer. During set-up of the optical system, the pre-scan system components must be aligned properly with the polygonal reflector, and at the proper angle, for proper beam reflectance by the polygonal reflector.

A known post-scan optical system includes lenses which function to transform the light beam reflected from the polygonal reflector of the scanning sub-system into a beam having spot size suitable for the laser printing operation, and which function in what is known in the art as an f-theta lens system. The f-theta lens system functions principally to compensate spot positional location on the scanned object as a function of the scanning mirror rotation angle theta, in order to produce a nearly linear change in position on the scanned object for a linear change in angle of rotation of a polygon facet. The post-scan system may include a plurality of f-theta lenses. In addition, this post-scan optical system provides process direction correction to minimize potential facet-to-facet generated process direction jitter. The post-scan optical sub-system may also include one or more folding mirrors to adapt to the geometry of the printer apparatus. During setup of the laser printer, it is necessary to position the fold mirror and to align the f-theta lens or lenses properly with the fold mirror scan image line, so that the scan image beam strikes the photoconductive member at the desired location. When two or more f-theta lenses are used, setup of the printer further requires proper alignment of the f-theta lenses relative to each other. Separate mounting hardware for each, as is known in the past, compounds alignment difficulties, as each contributes tolerance errors to the overall subsystem tolerance error.

The pre-scan optical sub-system defines the light beam axis between the laser diode source and the rotatable polygonal reflector, and establishes the beam diameters and curvature on that axis. Although the optical components used in this sub-system are relatively uncomplicated from a design standpoint, the pre-scan optical sub-system utilizes very short focal length optics of high numeric aperture for reasons of size and efficiency of coupling to the laser diode. As a result, sensitivity to component tolerance and to placement accuracy is very important. Also, the pre-scan optical sub-system is required to produce a beam waist in the cross scan or processing direction, perpendicular to the scan direction, at a precise location relative to the polygonal reflector. Therefore, proper orientation or alignment of the pre-scan system to the scanning subsystem is important.

Color laser printers employ four printing stations, one each for black, magenta, cyan and yellow toners. It is known to provide each as a more or less independent system, so that each printing station has separate pre-scan, scanning and post-scan subsystems. Therefore, each component of the three major subsystems of an optical scanning system is provided four times in the printer, once for each printing station.

In the overall cost of a laser printer, the printhead, including the optical system is one of the more expensive components, and the optical system is a substantial part of the cost. The most expensive component of an optical system for a laser printer is the polygon mirror/motor component of the scanning subsystem. In a color printer, where four polygon reflectors are used, this highest cost component is supplied four times.

In printing color images with four scanning beams, for highest quality printing, it is important to minimize the locating error created by each printhead imaging system. Compounding errors from the four printheads can result in an unacceptable image quality. Each scan image must be position accurately with respect to the other scanned images, with errors in positioning referred to as "registration" errors.

Thus, not only is it necessary to align components of the pre-scan, scanning and post-scan subsystems relative to each other within a printhead optical system, it is also necessary to align one printhead relative to the other printheads, so that the four scan images are properly registered with respect to each other, to produce the highest quality image.

What is needed in the art is an improved optical system for color laser scanning devices which minimizes cost and minimizes registration scan errors, while facilitating assembly and setup of the device to meet optical performance requirements.

SUMMARY OF THE INVENTION

The present invention provides a laser imaging system for a color laser imaging device that includes individual pre-scan and post-scan optical assemblies for each printhead. Two printheads share a common scanning assembly so that only two scanning assemblies are required in a four color device. The pre-scan and post-scan assemblies have improved structures for adjustment.

The invention comprises, in one form thereof, a laser scanning color imaging device with first, second, third and fourth pre-scan optical assemblies; first, second, third and fourth post-scan optical assemblies; and first and second scanning assemblies. Each scanning assembly includes a rotatable polygon reflector and an axis about which the polygon reflector rotates. Two of the pre-scan optical assemblies and two of the post-scan optical assemblies are operatively associated with one of the scanning assemblies, and the other two of the pre-scan optical assemblies and the other two of the post-scan optical assemblies are operatively associated with the other of the scanning assemblies. The first, second, third and fourth post-scan assemblies each include first and second f-theta lenses and a frame member holding the f-theta lenses.

The invention comprises, in another form thereof, a post-scanning assembly for a laser scanning device. The post-scanning assembly includes a fold mirror having a scan image line; first and second f-theta lenses; and an adjustable frame. The first and second f-theta lenses are mounted on the frame.

The invention comprises, in a further form thereof, a color laser printer with a first polygon reflector rotatable about a first polygon axis, first and second pre-scan assemblies operatively disposed to direct light beams originated thereby to the first polygon reflector, and first and second post-scan optical assemblies configured and arranged to receive reflected light in the form of first and second scanning beams from the first polygon reflector. The first post-scan optical assembly receives reflected light originating from the first pre-scan assembly, and the second post-scan optical assembly receives reflected light originating from the second pre-scan assembly. A first PC drum is operatively arranged to receive the reflected scanning beam from the first post-scan optical assembly; and a second PC drum is operatively arranged to receive the reflected scanning beam from the second post-scan optical assembly. The first and second post-scan optical assemblies each include a fold mirror having a scan image line, a frame and first and second f-theta lenses attached to the frame.

The invention comprises, in still another form thereof, a pre-scan assembly for a laser scanning imaging device, the device including a scanning system having a polygonal reflector rotatable about an axis. The pre-scan assembly has a first laser diode collimation module for emitting a first beam of light at the polygonal reflector, and a second laser diode collimation module for emitting a second beam of light at the polygonal reflector. The first and second laser collimation modules are mounted on first and second pre-scan plates. At least one of the first and second pre-scan plates is rotatable about the axis of the polygonal reflector.

An advantage of the present invention is providing a color laser scanning device having reduced costs for manufacturing and assembly through the reduction of the number of more costly components required in the device, and the use of identical components in corresponding systems of the printer.

Another advantage is providing a laser scanning device having simplified assembly, set-up and adjustment between various components of the device.

Yet another advantage is providing a laser scanning device having reduced registration errors in the scan direction between the individual color images.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
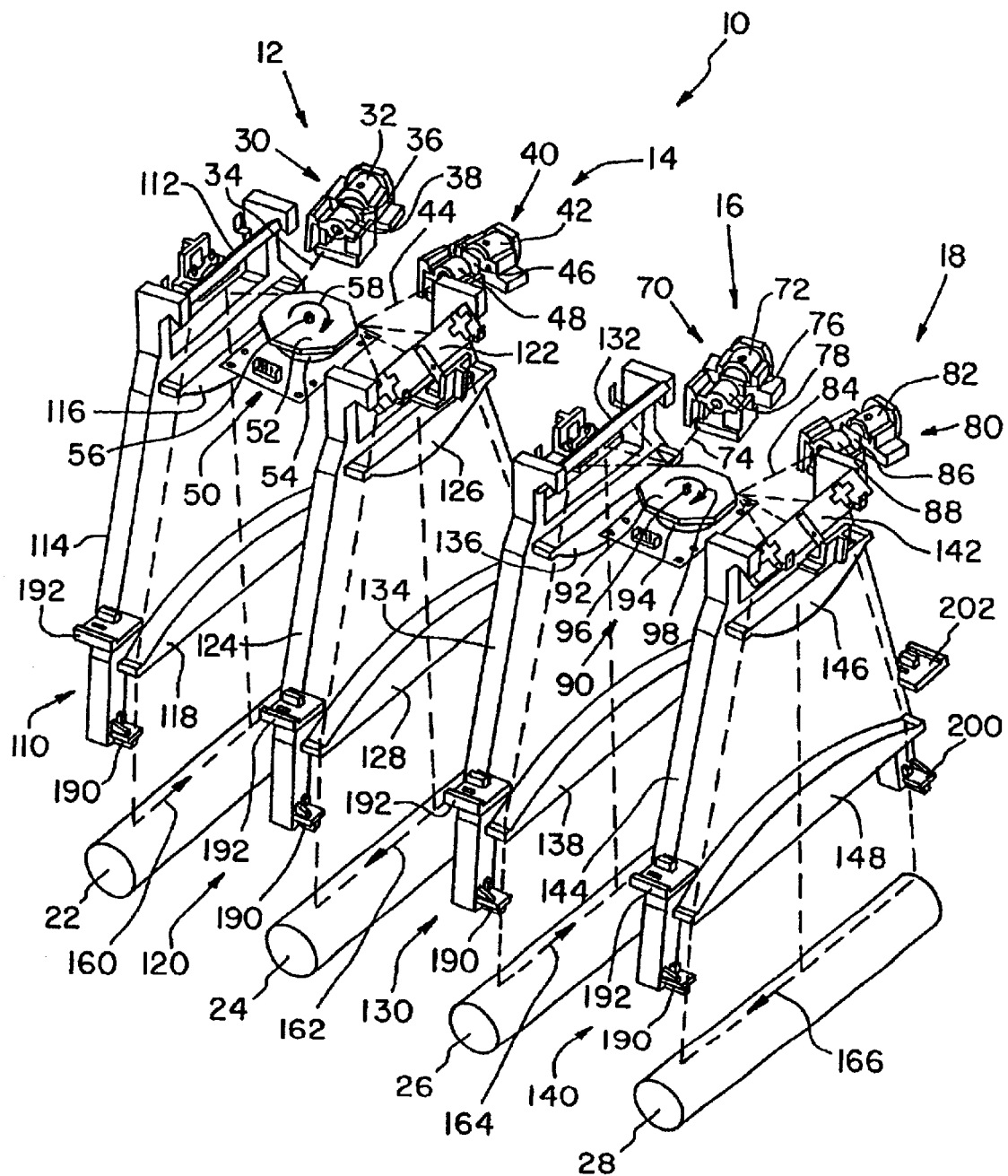
FIG. 1 is a perspective view of an optical system of the present invention, showing the major optical components.

Referring now to the drawings, and particularly to FIG. 1, there is shown a laser scanning color imaging device 10 according to the present invention. Device 10 includes four printheads 12, 14, 16 and 18 for printing black, magenta cyan and yellow toners, respectively. Printheads 12, 14, 16 and 18 operate in known manner to create electrostatic latent images on photoconductive elements, such as photoconductive drums 22, 24, 26 and 28, respectively. Black, magenta, cyan and yellow toners from developing units (not shown) are applied to the latent images on photoconductive drums 22, 24, 26 and 28, respectively. The toner images are thereafter applied either directly or indirectly to the desired media for receiving the final image, and the toner image is fixed on the media in a fuser unit (not shown) through the application of heat and pressure.

Printhead 12, for creating the black image, includes a pre-scan assembly 30. A laser diode collimation module 32 thereof has a laser diode and a collimation lens (not shown) therein for emitting a laser beam 34. Laser beam 34 passes through an aperture 36 and a pre-scan lens 38 for sizing and focusing beam 34, all in known manner.

Printhead 14, for creating the magenta image, includes a pre-scan assembly 40. A laser diode collimation module 42 thereof has a laser diode and a collimation lens (not shown) therein for emitting a laser beam 44. Laser beam 44 passes through an aperture 46 and a pre-scan lens 48 for sizing and focusing beam 44, all in known manner.

Printhead 12 and printhead 14 share a common scanning assembly 50, including a rotatable polygonal reflector 52 driven by a motor 54 via a shaft 56 to rotate in a clockwise direction as shown in the drawings, indicated by arrow 58. Laser beams 34 and 44 from pre-scan optical assemblies 30 and 40, respectively, are directed at reflector 52.

Printhead 16, for creating the cyan image, includes a pre-scan assembly 70. A laser diode collimation module 72 thereof has a laser diode and a collimation lens (not shown) therein for emitting a laser beam 74. Laser beam 74 passes through an aperture 76 and a pre-scan lens 78 for sizing and focusing beam 74, all in known manner.

Printhead 18, for creating the yellow image, includes a pre-scan assembly 80. A laser diode collimation module 82 thereof has a laser diode and a collimation lens (not shown) therein for emitting a laser beam 84. Laser beam 84 passes through an aperture 86 and a pre-scan lens 88 for sizing and focusing beam 84, all in known manner.

Printhead 16 and printhead 18 share a common scanning assembly 90, including a rotatable polygonal reflector 92 driven by a motor 94 via a shaft 96 to rotate in a clockwise direction as shown in the drawings, indicated by arrow 98. Laser beams 74 and 84 from pre-scan optical assemblies 70 and 80, respectively, are directed at reflector 92.

Pre-scan assemblies 30, 40, 70 and 80 for printheads 12, 14, 16 and 18, respectively, contain identical optical components, thereby minimizing tooling and parts costs. Thus, laser diode collimation modules 32, 42, 72 and 82 can be of identical components, as can apertures 36, 46, 76 and 86; and pre-scan lenses 38, 48, 78 and 88. Printheads 12 and 14 share common scanning assembly 50, and printheads 16 and 18 share common scanning assembly 90. Since device 10 thereby requires only two scanning assemblies, which are the most expensive components of device 10, considerable expensive is saved in the components for color laser scanning device 10. Scanning assemblies 50 and 90 contain identical components, such as reflectors 52 and 92, and motors 54 and 94, thereby further minimizing tooling and parts costs, and simplifying assembly.

Printhead 12 includes a post-scan optical assembly 110 having a fold mirror 112 and a rigid frame 114 that holds a first f-theta lens 116 and a second f-theta lens 118. Rigid frame 114 is mounted to pivot about the scan image line of fold mirror 112. Printhead 14 includes a post-scan optical assembly 120 having a fold mirror 122 and a rigid frame 124 that holds a first f-theta lens 126 and a second f-theta lens 128. Rigid frame 124 is mounted to pivot about the scan image line of fold mirror 122. Printhead 16 includes a post-scan optical assembly 130 having a fold mirror 132 and a rigid frame 134 that holds a first f-theta lens 136 and a second f-theta lens 138. Rigid frame 134 is mounted to pivot about the scan image line of fold mirror 132. Printhead 18 includes a post-scan optical assembly 140 having a fold mirror 142 and a rigid frame 144 that holds a first f-theta lens 146 and a second f-theta lens 148. Rigid frame 144 is mounted to pivot about the scan image line of fold mirror 142.

Thus, each printhead 12, 14, 16 and 18 has a separate post-scan optical assembly 110, 120, 130 and 140, respectively, transmitting scanned beams 34, 44, 74 and 84 from scanning assemblies 50 and 90 to photo-conductive drums 22, 24, 26 and 28. Post-scan optical assembly 110 receives laser beam 34 from scanning assembly 50. Fold mirror 112 redirects the scanned beam 34 through first f-theta lens 116 and second f-theta lens 118 to the surface of photo-conductive drum 22, to scan an image line 160. Post-scan optical assembly 120 receives laser beam 44 from scanning assembly 50. Fold mirror 122 redirects the scanned beam 44 through first f-theta lens 126 and second f-theta lens 128 to the surface of photo-conductive drum 24, to scan an image line 162. Post-scan optical assembly 130 receives laser beam 74 from scanning assembly 90. Fold mirror 132 redirects the scanned beam 74 through first f-theta lens 136 and second f-theta lens 138 to the surface of photo-conductive drum 26, to scan an image line 164. Post-scan optical assembly 140 receives laser beam 84 from scanning assembly 90. Fold mirror 142 redirects the scanned beam 84 through first f-theta lens 146 and second f-theta lens 148 to the surface of photo-conductive drum 28, to scan an image line 166. Each post-scan optical assembly 110, 120, 130 and 140 contains similar components so that tooling and parts costs are minimized. Thus, for example fold mirrors 112, 122, 132 and 142 are identical components, as are the respective first f-theta lenses 116, 126, 136 and 146; and the respective second f-theta lenses 118, 128, 138 and 148.

To allow for the use of the same pre-scan optical components in each pre-scan optical assembly 30, 40, 70 and 80; and the same post-scan optical components in each post-scan optical assembly 110, 120, 130 and 140, the optical paths for each printhead 12, 14, 16 and 18 must be of identical length. Pre-scan optical assembly 30 is positioned at a distance and at an angle from scanning assembly 50 similar to the distance and a mirror image angle at which pre-scan optical assembly 40 is positioned from scanning assembly 50. So also, pre-scan optical assemblies 70 and 80 are positioned at similar distances and angles with respect to scanning assembly 90.

To reduce scan direction registration errors, pre-scan optical assemblies 30 and 40 are positioned on the same side of post-scan optical assemblies 110 and 120, and the reflected beams 34 and 44 from reflector 52. With reflector 52 rotating about an axis defined by shaft 56 in the direction indicated by arrow 58, laser beam 34 is caused to traverse photoconductive drum 22 in the direction indicated by the arrow of image line 160. At the same time, laser beam 44 is caused to traverse photoconductive drum 24 in the direction indicated by the arrow of image line 162, which is opposite to the direction of beam 34 on drum 22. As a result, the accumulated linearity curves have the same shapes for the scanned image lines on both drums 22 and 24, and registration errors in the scan direction are minimized. If beams 34 and 44 were directed at reflector 52 from opposite sides thereof, the accumulated linearity curves would be reversed, and the resulting registration errors in the scan direction would be maximized. By directing laser beams 34 and 44 toward reflector 52 from the same side and over the same, though mirror image angles, the linearity curves are closely matched, and error in registration in the scan direction for the black and magenta images are minimized.

Similarly, pre-scan optical assemblies 70 and 80 are positioned on the same side of post-scan optical assemblies 130 and 140, and the reflected beams 74 and 84 from reflector 92. With reflector 92 rotating about an axis defined by shaft 96 in the direction indicated by arrow 98, laser beam 74 is caused to traverse photoconductive drum 26 in the direction indicated by the arrow of image line 164. At the same time, laser beam 84 is caused to traverse photoconductive drum 28 in the direction indicated by the arrow of image line 166, which is opposite to the direction of beam 74 on drum 26. As a result, the accumulated linearity curves have the same shapes for the scanned image lines on both drums 26 and 28, and registration errors in the scan direction are minimized. If beams 74 and 84 were directed at reflector 92 from opposite sides thereof, the accumulated linearity curves would be reversed, and the resulting registration errors in the scan direction would be maximized. By directing laser beams 74 and 84 toward reflector 92 from the same side and over the same angles, the linearity curves are closely matched, and error in registration in the scan direction for the cyan and yellow images are minimized.

With the arrangement described above the cumulative linearity error differences are minimized, and registration error between the black, magenta, cyan and yellow images on drums 22, 24, 26 and 28, respectively, are reduced, leading to higher quality images.

Figure 2:
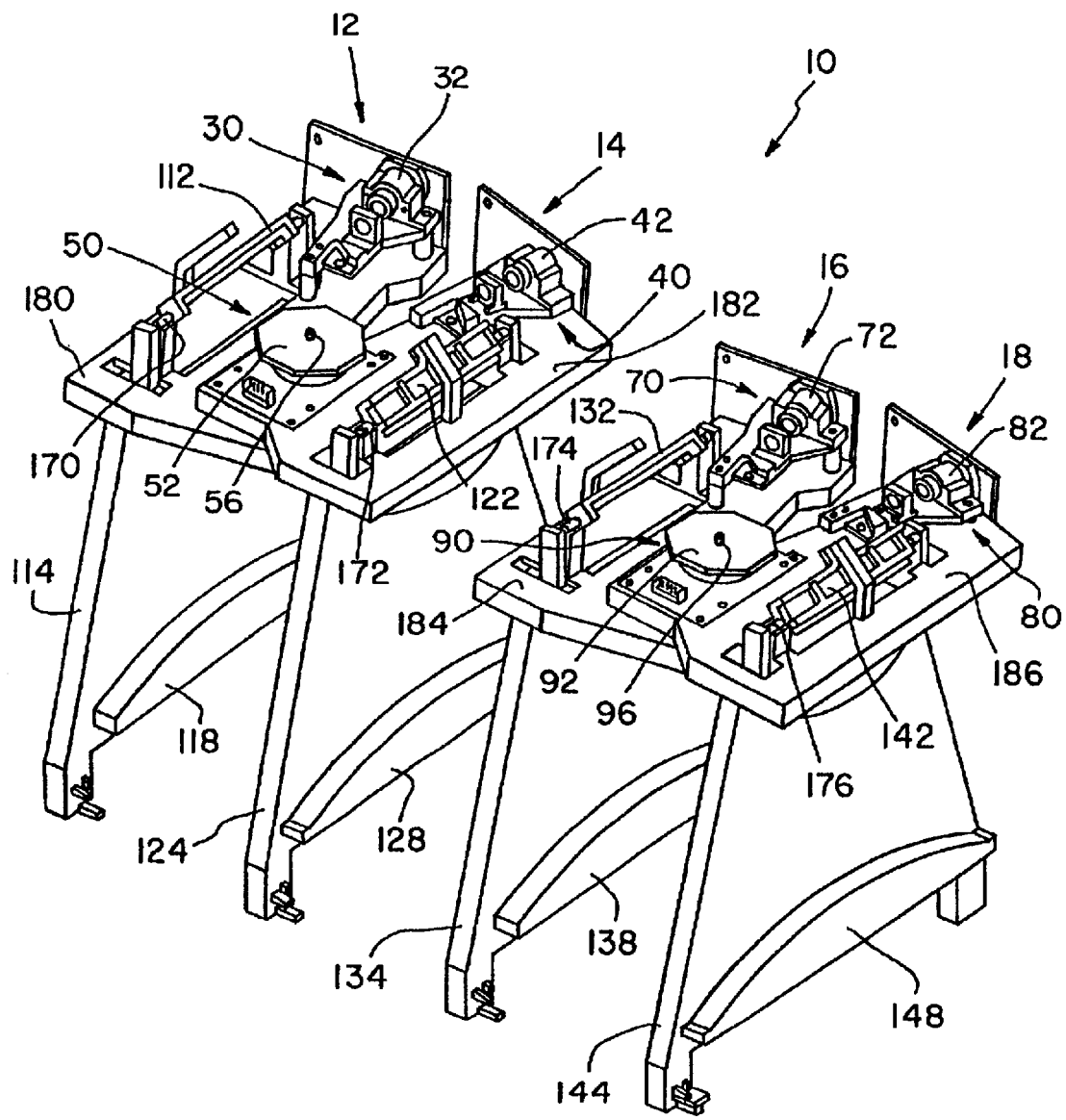
FIG. 2 is a perspective view of the optical system shown in FIG. 1, but also showing various mounting platforms for the optical components.

First and second f-theta lens pairs 116 and 118, 126 and 128, 136 and 138, 146 and 148 are rigidly mounted to frames 114, 124, 134, and 144, respectively, and frames 114, 124, 134 and 144 are pivotally mounted at axes 170, 172, 174 and 176, respectively, (FIG. 2). Fold mirrors 112, 122, 132 and 142 are similarly pivotally mounted about axes 170, 172, 174 and 176 independent of frames 114, 124, 134 and 144. During the assembly and adjustment of device 10, fold mirrors 112, 122, 132 and 142 can be adjusted, and frames 114, 124, 134 and 144 can be rotated, to achieve the desired process location for scan beams 34, 44, 74 and 84 on photoconductive drums 22, 24, 26 and 28, respectively. Since the first and second f-theta lens pairs 116 and 118, 126 and 128, 136 and 138, 146 and 148 are rigidly mounted to frames 114, 124, 134, and 144, respectively, it is not necessary to adjust each lens independently. Instead, each pair of first and second f-theta lenses 116 and 118, 126 and 128, 136 and 138, and 146 and 148 is adjusted as a unit, rigidly mounted to frames 114, 124, 134, 144, respectively, minimizing tolerance errors in accurately controlling relative lens alignment.

As shown in FIG. 2, laser diode collimation modules 32, 42, 72 and 82 are mounted on plates 180, 182, 184 and 186, respectively. During assembly, set-up and adjustment of device 10, plate 180 can be rotated to align the scan line for the black image on photoconductive drum 22, as desired. Plate 180 is then secured in place, such as by a locking device (not shown) connected to a frame (not shown) in device 10. Plate 182 can be rotated about an axis defined by shaft 56, to provide skew adjustment of laser beam 44 for the magenta image relative to the black image. After proper skew adjustment, plate 182 is locked in position, such as by a locking fixture (not shown) to plate 180 or to a frame (not shown) in device 10. Rotation of plates 180 and 182 does not change the optical path lengths between reflector 52 and laser diode collimation modules 32 and 34.

Plates 184 and 186 can be rotated similarly about an axis defined by shaft 96, for skew adjustment of the cyan and yellow images, respectively, relative to the black image. Plates 184 and 186 are also locked in place, such as by a locking device (not shown) to a frame (not shown) in device 10. Rotation of plates 184 and 186 does not change the optical path lengths between reflector 92 and laser diode collimation modules 36 and 38.

With the structure described above, the desired optical path lengths and relationships can be maintained while adjusting the skew and process direction relationships of laser beams 34, 44, 74 and 84.

As known to those skilled in the art, start-of-scan and end-of-scan signals are required to synchronize the laser scans, and to detect drift in registration that can occur with temperature changes. A mirror assembly 190 and a beam detection sensor 192 are provided on each frame 114, 124, 134 and 144 on the side thereof shown in the foreground of FIG. 1. Each frame 114, 124, 134 and 144 further includes a mirror assembly 200 and a beam detection sensor 202 on the side opposite the side shown in the foreground of FIG. 1. Only one mirror assembly 200 and one beam detection sensor 202 for frame 144 are shown in FIG. 2; however, it should be understood that frames 114, 124 and 134 also have similar mirror assemblies 200 and beam detection sensors 202. For the black image scanned on photoconductive drum 22 and the cyan image scanned on photoconductive drum 26 sensor 192 provides the start-of-scan signal, and sensor 202 provides the end-of-scan signal. For the magenta image scanned on photoconductive drum 24 and the yellow image scanned on photoconductive drum 28 sensor 202 provides the start-of-scan signal, and sensor 192 provides the end-of-scan signal.

The present invention provides a reduced cost optical system for color laser printers and the like by utilizing one polygonal reflector for two printheads, and by simplifying assembly and set-up procedures. Fixturing in the printer, including mounting plates for pre-scan systems and frames for f-theta lenses provide skew and process direction adjustability without changes to the optical path lengths. As a result, similar optical components can be used in each printhead. The optical system orientation reduces scan direction registration errors, improving print quality.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A laser scanning color imaging device, comprising:

first, second, third and fourth pre-scan optical assemblies;

first, second, third and fourth post-scan optical assemblies;

first and second scanning assemblies, each including a rotatable polygon reflector and an axis about which said polygon reflector rotates;

two of said pre-scan optical assemblies and two of said post-scan optical assemblies operatively associated with one of said scanning assemblies, and an other two of said pre-scan optical assemblies and an other two of said post-scan optical assemblies operatively associated with an other of said scanning assemblies; and said first, second, third and fourth post-scan assemblies each including first and second f-theta lenses and a frame member holding said first and second f-theta lenses.

2. The imaging device of claim 1, each said first, second, third and fourth post-scan assemblies including a fold mirror having a scan image line, and a pivot means connecting said frame member to pivot relative to said scan image line of said fold mirror.

3. The imaging device of claim 2, one of said first and second pre-scan assemblies disposed on a plate rotatable about said axis of said first polygon reflector.

4. The imaging device of claim 3, one of said third and fourth pre-scan assemblies disposed on a plate rotatable about said axis of said second polygon reflector.

5. The imaging device of claim 1, one of said first and second pre-scan assemblies disposed on a plate rotatable about said axis of said first polygon reflector.

6. The imaging device of claim 5, one of said third and fourth pre-scan assemblies disposed on a plate rotatable about said axis of said second polygon reflector.

7. A post-scanning assembly for a laser scanning device, said post-scanning assembly comprising:

a fold mirror having a scan image line;

first and second f-theta lenses receiving reflected light from said fold mirror; and an adjustable frame, said first and second f-theta lenses mounted on said frame.

8. The post-scanning assembly of claim 7, said frame pivotally mounted relative to said scan image line of said fold mirror.

9. A color laser printer comprising:

a first polygon reflector rotatable about a first polygon axis;

first and second pre-scan assemblies operatively disposed to direct light beams originated thereby to said first polygon reflector;

first and second post-scan optical assemblies configured and arranged to receive reflected light in the form of first and second scanning beams from said first polygon reflector, said first post-scan optical assembly receiving reflected light originating from said first pre-scan assembly, and said second post-scan optical assembly receiving reflected light originating from said second pre-scan assembly;

a first PC drum operatively arranged to receive the reflected scanning beam from said first post-scan optical assembly;

a second PC drum operatively arranged to receive the reflected scanning beam from said second post-scan optical assembly; and said first and second post-scan optical assemblies each including a fold mirror having a scan image line, a frame and first and second f-theta lenses attached to said frame and receiving reflected light from said fold mirror.

10. The printer of claim 9, said frames being pivotal relative to said scan image lines of said fold mirrors.

11. The printer of claim 10, said first scanning beam and said second scanning beam traversing said first and second photoconductive drums, respectively, in opposite directions.

12. The printer of claim 11, said first pre-scan assembly mounted on a first pre-scan plate and said second pre-scan assembly mounted on a second pre-scan plate, at least one of said first and second pre-scan plates being pivotable about said axis of said first polygon reflector.

13. The printer of claim 9, said first pre-scan assembly mounted on a first pre-scan plate and said second pre-scan assembly mounted on a second pre-scan plate, at least one of said first and second pre-scan plates being pivotable about said axis of said first polygon reflector.

14. The printer of claim 13, said first scanning beam and said second scanning beam traversing said first and second photoconductive drums, respectively, in opposite directions.

15. The printer of claim 9, said first scanning beam and said second scanning beam traversing said first and second photoconductive drums, respectively, in opposite directions.

16. The printer of claim 9, further comprising:
a second polygon reflector rotatable about a second polygon axis;
third and fourth pre-scan assemblies operatively disposed to direct light beams originated thereby to said second polygon reflector;
third and fourth post-scan optical assemblies configured and arranged to receive reflected light in the form of third and fourth scanning beams from said second polygon reflector, said third post-scan optical assembly receiving reflected light originating from said third pre-scan assembly, and said fourth post-scan optical assembly receiving reflected light originating from said fourth pre-scan assembly;
a third PC drum operatively arranged to receive the reflected scanning beam from said third post-scan optical assembly;
a fourth PC drum operatively arranged to receive the reflected scanning beam from said fourth post-scan optical assembly; and
said third and fourth post-scan optical assemblies each including a fold mirror having a scan image line, a frame and first and second f-theta lenses attached to said frame, said f-theta lenses of said third and fourth post-scan optical assemblies receiving reflected light from said fold mirror of said third and fourth post-scan optical assemblies, respectively.

17. The printer of claim 16, said first scanning beam and said second scanning beam traversing said first and second photoconductive drums, respectively, in opposite directions; and said third scanning beam and said fourth scanning beam traversing said third and fourth photoconductive drums, respectively, in opposite directions.

18. The printer of claim 16, said first, second, third and fourth pre-scan assemblies mounted on first, second, third and fourth pre-scan plates, respectively; at least one of said first and second pre-scan plates being pivotable about said axis of said first polygon reflector; and at least one of said third and fourth pre-scan plates being pivotal about said axis of said second polygonal reflector.

19. A pre-scan assembly for a laser scanning imaging device, said device including a scanning system having a first polygonal reflector rotatable about a first axis, said pre-scan assembly comprising:
a first laser diode collimation module for emitting a first beam of light at the first polygonal reflector, and a second laser diode collimation module for emitting a second beam of light at the first polygonal reflector, said first and second laser collimation modules mounted on first and second pre-scan plates, at least one of said first and second pre-scan plates being rotatable about the first axis.

20. The pre-scan assembly of claim 19, both said first and second pre-scan plates being rotatable about the first axis.

21. The pre-scan assembly of claim 19, said first and second laser diode collimation modules disposed on a same side of the first polygonal reflector at substantially similar mirror image angles to and distances from the first polygonal reflector.

22. The pre-scan assembly of claim 21, both said first and second pre-scan plates being rotatable about the first axis.

23. The pre-scan assembly of claim 19 for a laser scanning imaging device including a scanning system further having a second polygonal reflector rotatable about a second axis, said pre-scan assembly including:
a third laser diode collimation module for emitting a third beam of light at the second polygonal reflector, and a fourth laser diode collimation module for emitting a fourth beam of light at the second polygonal reflector, said third and fourth laser collimation modules mounted on third and fourth pre-scan plates, at least one of said third and fourth pre-scan plates being rotatable about the second axis.

24. The pre-scan assembly of claim 23, both said third and fourth pre-scan plates being rotatable about the second axis.

25. The pre-scan assembly of claim 23, said first and second laser diode collimation modules disposed on a same side of the first polygonal reflector at substantially similar mirror image angles to and distances from the first polygonal reflector, and said third and fourth laser diode collimation modules disposed on a same side of the second polygonal reflector at substantially similar mirror image angles to and distances from the second polygonal reflector.

26. The pre-scan assembly of claim 25, said first, second, third and fourth laser diode collimation diodes each disposed on same sides of the first and second polygonal reflectors at substantially similar mirror image angles to and distances from the first and second polygonal reflectors.

27. The pre-scan assembly of claim 26, both said first and second pre-scan plates being rotatable about the first axis, and both said third and fourth pre-scan plates being rotatable about the second axis.

* * * * *